United States Patent
Kong et al.

(10) Patent No.: US 12,286,709 B2
(45) Date of Patent: Apr. 29, 2025

(54) CARBIDE MATERIAL FOR CUTTING DEVICES AND ASSOCIATED METHOD OF MANUFACTURE

(71) Applicant: C4 Carbides Limited, Newmarket (GB)

(72) Inventors: Choon Yen Kong, Newmarket (GB); Andreas Chrysanthou, Newmarket (GB); Pavels Sevcenko, Newmarket (GB)

(73) Assignee: C4 Carbides Limited, Newmarket (GB)

( * ) Notice: Subject to any disclaimer, the term of this patent is extended or adjusted under 35 U.S.C. 154(b) by 0 days.

(21) Appl. No.: 16/894,693

(22) Filed: Jun. 5, 2020

(65) Prior Publication Data

US 2020/0392607 A1     Dec. 17, 2020

(30) Foreign Application Priority Data

Jun. 12, 2019    (GB) ..................................... 1908423

(51) Int. Cl.
    *C23C 24/10*            (2006.01)
    *B22F 10/25*            (2021.01)
    (Continued)

(52) U.S. Cl.
    CPC ............ *C23C 24/103* (2013.01); *B22F 10/25* (2021.01); *B22F 10/34* (2021.01); *B23B 27/14* (2013.01);
    (Continued)

(58) Field of Classification Search
    CPC ........... C22C 1/02; C22C 1/051; C22C 29/08; B22F 10/25; B22F 10/34
    See application file for complete search history.

(56) References Cited

U.S. PATENT DOCUMENTS

| 4,414,029 A | 11/1983 | Newman et al. |
| 7,661,491 B2 * | 2/2010 | Kembaiyan ......... C22C 32/0052 |
| | | 175/425 |

(Continued)

FOREIGN PATENT DOCUMENTS

| CN | 101122002 A | 2/2008 |
| CN | 101804524 A | 8/2010 |

(Continued)

OTHER PUBLICATIONS

Espacenet machine translation of CN 101122002 A (Year: 2021).*

(Continued)

*Primary Examiner* — Brian D Walck
*Assistant Examiner* — Nazmun Nahar Shams
(74) *Attorney, Agent, or Firm* — Reinhart Boerner Van Deuren s.c.

(57) ABSTRACT

There is provided a carbide material including tungsten carbide of 60 to 85 weight %, titanium carbides of 10 to 25 weight % and preferably a metal matrix of 0.5 to 20 weight % including Fe and optionally at least one or both of the metals Co or Ni. There is also provided a device including a ferrous substrate and such a carbide material and a method of manufacturing a device, the method comprising mixing powders comprising carbon, tungsten and a scavenger material such as titanium, placing the mixed powders proximal a ferrous substrate, impinging an energy source onto the powdered materials to create a melt pool formed of the powders and the material of the substrate, and allowing the melt pool to solidify to form a carbide material substantially free from iron tungsten carbides of $(W, Fe)_6C$ and $(W, Fe)_{12}C$ type.

7 Claims, 2 Drawing Sheets

(51) Int. Cl.
  *B22F 10/34* (2021.01)
  *B22F 10/36* (2021.01)
  *B22F 10/368* (2021.01)
  *B22F 12/13* (2021.01)
  *B22F 12/41* (2021.01)
  *B22F 12/52* (2021.01)
  *B22F 12/55* (2021.01)
  *B23B 27/14* (2006.01)
  *C22C 1/02* (2006.01)
  *C22C 1/051* (2023.01)
  *C22C 29/08* (2006.01)

(52) U.S. Cl.
  CPC ............... *C22C 1/02* (2013.01); *C22C 1/051* (2013.01); *C22C 29/08* (2013.01); *B22F 10/36* (2021.01); *B22F 10/368* (2021.01); *B22F 12/13* (2021.01); *B22F 12/41* (2021.01); *B22F 12/52* (2021.01); *B22F 12/55* (2021.01)

(56) References Cited

U.S. PATENT DOCUMENTS

| | | | | |
|---|---|---|---|---|
| 2012/0144753 A1* | 6/2012 | Okuno | ............... | C22C 29/08 51/309 |
| 2012/0258273 A1 | 10/2012 | Churchill | | |
| 2016/0114419 A1 | 4/2016 | Scott et al. | | |

FOREIGN PATENT DOCUMENTS

| | | |
|---|---|---|
| CN | 102021464 A | 4/2011 |
| CN | 102994853 A | 3/2013 |
| CN | 103920872 A | 7/2014 |
| CN | 104233040 A | 12/2014 |
| CN | 106435581 A | 2/2017 |
| CN | 106929738 A | 7/2017 |
| CN | 108300993 A | 7/2018 |
| CN | 108359975 A | 8/2018 |
| CN | 109023361 A | 12/2018 |
| CN | 109317682 A | 2/2019 |
| CN | 109355657 A | 2/2019 |
| CN | 108165988 B | 8/2019 |
| GB | 573598 A | 11/1945 |
| GB | 861349 A | 2/1961 |
| JP | 2017-524810 | 8/2017 |

OTHER PUBLICATIONS

Dialog machine translation of CN 109023361 A (Year: 2021).*
Mingyang Zhang et al. "Microstructure evolution, recrystallization and tribological behavior of TiC/WC composite ceramics coating" Vacuum 166 (2019) 64-71 (Year: 2019).*
V. A. Poluboyarov et.al. [Reactive deposition of tungsten and titanium carbides by induction plasma, Journal of Materials Science 30 (1995) 2325-2329] (Year: 1995).*
Lanzhou University of Technology. "Laser preparation of WC and in-situ TiC ceramic reinforced complex phase coating," May 2007, 12 pages.
English Translation of Chinese Office Action regarding Chinese Application No. 202010527356.6, dated Aug. 30, 2023, 9 pages.
«Carbon Graphite Products and Its Application», Jiang Wenzhong, pp. 33-34, Metallurgical Industry Press, Mar. 2017.
English Translation of «Carbon Graphite Products and Its Application», Jiang Wenzhong, pp. 33-34, Metallurgical Industry Press, Mar. 2017.

* cited by examiner

CARBIDE MATERIAL FOR CUTTING DEVICES AND ASSOCIATED METHOD OF MANUFACTURE

This application claims priority to United Kingdom Patent Application No.: GB 1908423.5, filed on Jun. 12, 2019, which is incorporated by reference for all purposes as if fully set forth herein.

FIELD OF THE INVENTION

This invention relates to a carbide material for deposition onto ferrous bases and to a method of manufacture of such a carbide material.

BACKGROUND TO THE INVENTION

For carbide materials used as coatings, it is often desirable to achieve a high hardness value and one common material is Tungsten carbide in a metal matrix of Cobalt or Nickel as it provides optimum hardness and toughness combined even under elevated temperatures and high impact conditions.

The carbide material can be deposited using additive manufacturing processes where a powder or a wire material is melted or sintered by a high energy concentration heat source such as a laser or an electron beam.

A known problem with deposition of Tungsten carbides onto ferrous bases using additive manufacturing techniques is the formation of highly brittle Iron-Tungsten carbides $(W,Fe)_6C$ and $(W,Fe)_{12}C$ which increase the brittleness of the material. Thus to date there has been a limit on the toughness of materials that can be achieved by additive manufacturing methods depositing Tungsten carbide onto ferrous bases. This has hindered the application of additive manufacturing methods to produce Tungsten carbide deposits on ferrous bases which can operate under high impact conditions such as in metal cutting tooling or rotary blade edges.

Adjustments to material composition aiming to increase hardness can cause other issues, in particular increasing the brittleness of the material and so increasing the rate of fracture. Thus to date there has been a limit on the hardness that can be achieved for a Tungsten carbide material whilst still providing a material suitable for cutting.

SUMMARY OF THE INVENTION

In accordance with one aspect of the present invention, there is provided a carbide material comprising Tungsten Carbide of 60 to 85 weight %, Titanium carbides of 10 to 25 weight %.

The carbide material may further comprise a metal matrix of 0.5 to 20 weight % comprising Fe.

The metal matrix may be in the range 4.5 to 20 weight %, particularly where another metal is incorporated into the metal matrix, such as at least one of Co or Ni. The metal matrix may thus preferably comprise Fe and at least one or both of the metals Co or Ni.

For preferred compositions, the metal matrix may preferably comprise Co and Fe.

The Titanium carbides may consist of TiC alone or may comprise a combination of TiC and (Ti,W)C, i.e. Titanium Carbide and Titanium Tungsten Carbide.

The carbide material may further comprise additional compounds in the range 0.5 to 8 weight %, the additional compounds being one or more of TaC, VC, NbC, HfC, ZrC, $Cr_3C_2$ and $Cr_7C_3$. These additional compounds refine the properties of grains within the material.

Addition of Tantalum is particularly preferred as it helps eliminate cracks during solidification of the material from a molten state.

Preferably spherical carbides within the material, such as (Ti, W) C and WC, have a grain size of 1 to 5 μm in diameter.

In accordance with another aspect of the invention, there is provided a device comprising a ferrous substrate, such as a steel substrate, and a carbide material as aforesaid formed on at least part of the substrate.

The device may be any device incorporating a ferrous substrate which requires the addition of a carbide material as a layer or edge, for example cutting devices such as linear edge blades, circular blades, saws, drills, drill bits or any tool or machine incorporating a steel substrate on which a carbide material is disposed for cutting purposes, such as lathes and milling machines, and also medical devices, medical implants, turbine blades, engine parts, electronic components.

The carbide material is preferably formed on an upper surface of the ferrous substrate and may be formed along an edge of the ferrous substrate.

In accordance with a further aspect of the invention, there is provided a method of manufacturing a device, and in particular a cutting device, the method comprising mixing powders comprising Carbon and Tungsten, either as individual elements, Tungsten Carbide or mixtures thereof, and a scavenger material and placing the mixed powders proximal a ferrous substrate, impinging an energy source onto the powdered materials to create a melt pool formed of the powders and the material of the substrate, and allowing the melt pool to solidify to form a carbide material substantially free from carbides of iron tungsten carbide of type $(W, Fe)_6C$ and $(W, Fe)_{12}C$, and preferably containing no more than 0.01% Iron Tungsten carbides of type $(W, Fe)_6C$ and $(W, Fe)_{12}C$, and more preferably no more than 0.001% Iron Tungsten carbides of type $(W, Fe)_6C$ and $(W, Fe)_{12}C$, the scavenger material preferentially reacting with Carbon in the ferrous or steel substrate as compared to Iron in the ferrous or steel substrate reacting with Carbon. This prevents formation of brittle Iron Tungsten carbides as there is no free Carbon available to form these detrimental carbides as in the melt pool the scavenger material reacts with the Carbon before the Iron. Thus the solidified material is substantially free from brittle carbides of Iron Tungsten Carbide such as $(W, Fe)_6C$ and $(W, Fe)_{12}C$ and has improved toughness.

The scavenger material is preferably Titanium being 10 to 25 weight % of the solidified carbide material.

The powders preferably comprise at least one, or a mixture of, the metals Co or Ni, whether provided as pure metals or compounds.

The powders may further comprise one or more of materials such as Ta, V, Nb, Hf, Zr and Cr either as elemental powders or compounds. These act to refine grains within the material. The Tantalum is particularly preferred as it eliminates the formation of cracks within the melt pool as the melt pool solidifies, further improving the structure of the formed carbide material.

Desirably the melt pool is formed at a temperature of 1500 to 3000° C.

The energy source may produce power between 300 W to 2 kW and will typically be a laser, such as a 1 kW continuous wave fibre laser, with a laser beam impinging on the substrate.

The method may further comprise moving the ferrous substrate relative to the energy source, preferably at a traverse speed of between 0.01 m/min-6 m/min, and more preferably between 1 m/min to 4 m/min.

The invention will now be described, by way of example, with reference to the accompanying drawings in which.

DESCRIPTION

Figure 1:
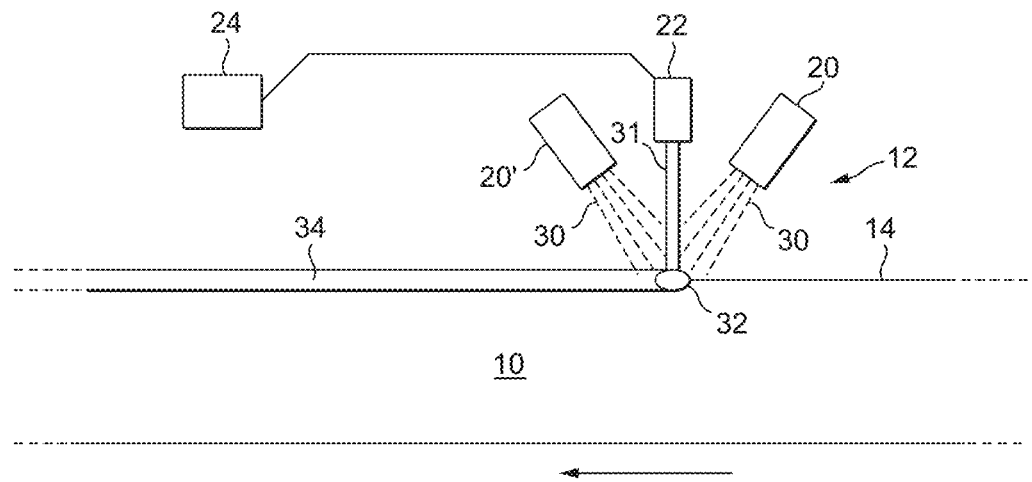
FIG. 1 is a schematic side view indicating a method of making a cutting device.

FIG. 1 shows a method of forming a carbide material on a device, such as a steel strip 10 that is useable as a blade within tools such as bandsaws, hacksaws, jigsaws, hole saws. If desired, strip 10 can be formed with teeth.

Strip 10 moves relative to workstation 12 to allow carbide material to be formed along an upper edge 14 of strip 10. Workstation 12 includes hoppers 20, 20' for providing material in the form of powders and a high power energy source 22, typically a 1 kW continuous wave fibre laser at 800 W although a range of power of 300 W to 2 kW could be applied. One or more computing devices 24 control movement of strip 10 relative to workstation 12 and hoppers 20, 20', the supply of material from hoppers 20, 20', and the output of energy source 22. Typically strip 10 moves at 2 m/min substrate traverse speed although the traverse speed can be varied between 0.01 m/min and 6 m/min.

There may be computer-executable instructions adapted to cause workstation 12 to act as a 3-D printer, the instructions being in a computer-readable medium either within device 24 or removable from device 24. As will be appreciated, one or multiple hoppers may be used.

Hoppers 20, 20' project powder 30 onto edge 14 and incident laser beam 31 forms a hot melt pool 32 in which the powders and the substrate are molten. The molten constituents react at a temperature between 1500° C. to 3000° C. and as strip 10 is moved relative to work station 12 the melt pool 32 cools to form solid carbide material 34.

If desired the carbide material can be deposited in a similar manner in drill bits, rotary blades or any other device required to have a carbide surface, for example turbine blades, engine components, medical devices and electronic components.

The method involves formation of carbides being Tungsten Carbide and Titanium carbides, and optionally in addition one or more of TaC, VC, NbC, $Cr_3C_2$, $Cr_7C_3$, ZrC and HfC, in the presence of a metal matrix (Fe, and optionally Co and/or Ni). The carbides are generated by reaction of elemental powder of Carbon with elemental powders of W, Ti. The solid carbide material 34 comprises Tungsten Carbide of 60 to 85 weight %, Titanium carbides of 10 to 25 weight % and a metal matrix of 4.5 to 20 weight % comprising Fe and at least one or both of the metals Co or Ni, and typically also comprises 0.5 to 8% of additives for grain refinement being one or more of TaC, VC, NbC, $Cr_3C_2$, $Cr_7C_3$, ZrC, HfC. Material 34 is formed using powdered elemental powders supplied from hoppers 20, 20' or using powders of individual compounds, such that the powders react with molten constituents of the steel substrate 10 in hot melt pool 32 to create a carbide material with the desired composition on the substrate 10. Before being placed onto substrate 10, elemental powders of Ti, W and C, optionally an elemental powder of Co and/or Ni, and optionally elemental powders of one or more of Ta, V, Nb, Cr, Zr and Hf, are weighed and mixed so that the resultant carbide material will have a composition 4.5 to 20 weight % metal matrix (Fe and optionally Co and/or Ni) along with 60 to 85 weight % WC, 10 to 25 weight % TiC and optionally 0.5 to 8 weight % of one or more of TaC, VC, NbC, $Cr_3C_2$, $Cr_7C_3$, ZrC, HfC.

The powders are mixed for at least 40 minutes and/or agglomerated to ensure a uniformly distributed mixture and are then placed onto substrate 10 to form a deposition bulk or delivered from hoppers 20, 20' through a nozzle with inert carrier gas, such as Argon or Helium. In the case of pre-placed powders, laser beam 31 is focussed on the top layer of the pre-placed powder, while in the case of delivery through the nozzle, laser beam 31 is focussed onto the substrate top surface or focussed onto the powder stream directly above the deposition area.

Laser beam 31 is focussed and scanned across the substrate area of deposition. The powder and the substrate in region 32 melts as a result of the energy from laser beam 31 creating melt pool 32. In the case of delivery through the nozzle, the substrate is melted to form a melt pool and powder 30 from the nozzle is delivered into melt pool 32. Some particles of the delivered powder can be pre-heated and partially melted while the powder stream is travelling through laser beam 31, but before reaching substrate 10. The molten constituents within melt pool 32 are a combination of delivered powders and the substrate material.

The process of creating the carbide material allows accurate deposition of carbide materials to net shape and near net shape avoiding material wastage and achieving faster production times and freedom of net product shape. Small areas of carbide material, such as square mms or smaller, can quickly and accurately be deposited onto a small device or circuit board without creating distortion or softening of the heat affected zone.

By having Titanium in relatively large quantities of 10 to 25 weight %, the Titanium acts as a scavenger material preferentially reacting with any Carbon as the carbide material is formed and preventing Carbon from reacting with the Iron present in the melt pool. This ensures that Iron in the steel substrate is neutralised and is unable to form brittle carbides of $(Fe,W)_{12}C$ and $(Fe,W)_6C$ and instead these are replaced by Titanium carbides such as TiC or (Ti,W)C. WC, and $W_2C$ that may be retained down to room temperature, are also present.

If desired, one or a mixture of Ta, V, Nb, Hf, Zr and Cr are added as grain refinement materials. Adding Ta prevents the formation of cracks within the material as melt pool 32 solidifies. After solidification, $(Fe,W)_{12}C$ and $(Fe,W)_6C$ carbides are absent from the microstructure.

Figure 2:
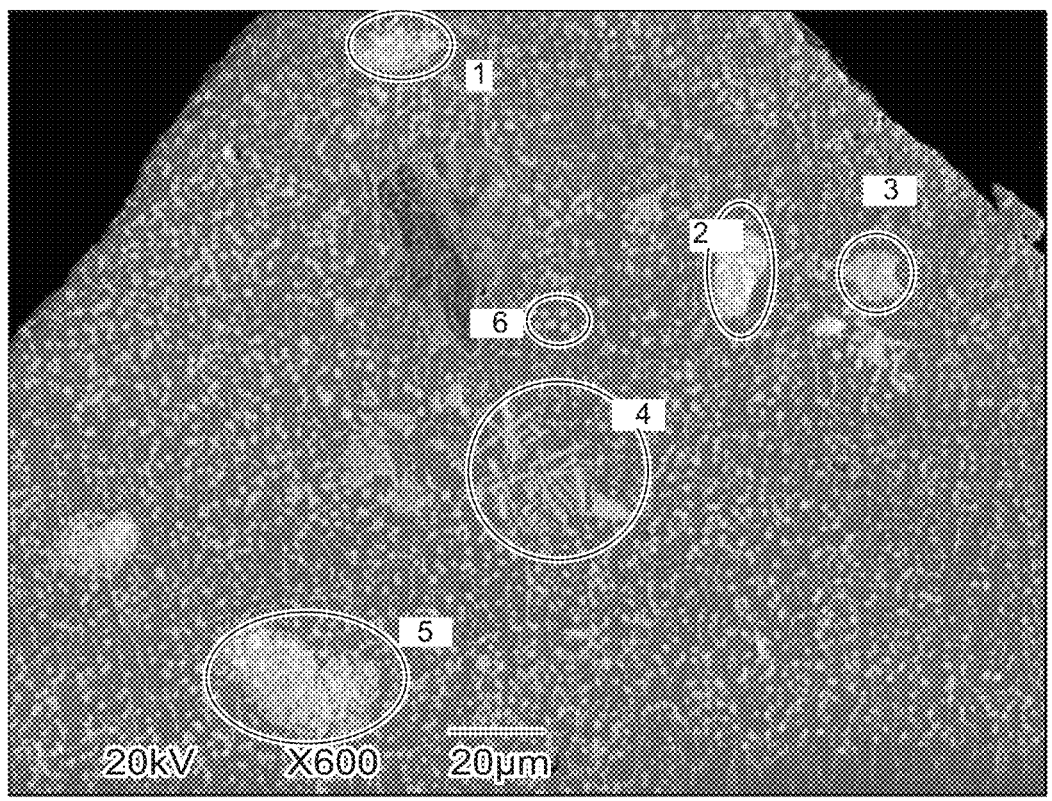
FIG. 2 is a micrograph of the microstructure of the carbide material.
Figure 3:
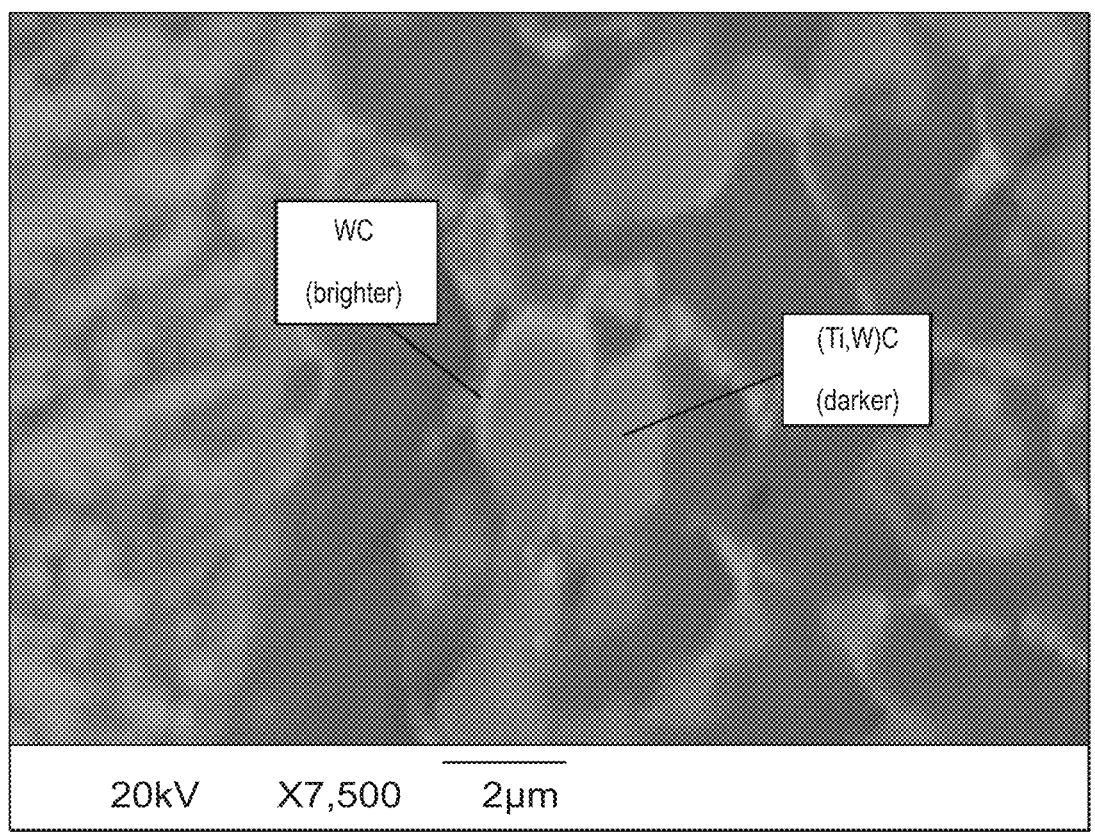
FIG. 3 is an enlarged micrograph showing fine detail of part of the carbide material.

FIGS. 2 and 3 show micrographs of material obtained from powders of Co, Ti, W, Ta and C. The Co was spherical powder, of purity 99.8%, gas atomized, and particle diameter ≤45 μm. The Ti was spherical powder, of purity 99.9%, gas atomized, and particle diameter 15-45 μm. The W powder had purity 99.9%, and particle diameter ≤25 μm. For Ta powder, purity was 99.97%, and particle diameter-325 mesh (≤44 μm). For C, synthetic graphite powder was used having particle diameter ≤20 μm. In proportion the powders were by weight % 0.175Co 0.16Ti 0.5773W 0.0094Ta 0.0783C. This was equivalent to 17.5 weight % Co, 20 weight % TiC, 61.5 weight % WC and 1 weight % TaC so as to give a final material having a composition 4.5 to 20 weight % matrix (Fe and Co), 60 to 85 weight % WC, 10 to 25 weight % TiC and optionally 0.5 to 8%(TaC, VC, NbC, CrC, ZrC in sum or individually).

The deposited material 34 consists of a metal matrix of Fe and Co, and in addition W, and multiple types of carbides being TiC, WC, $W_2C$, (Ti,W)C and TaC. From FIG. 2, it can be seen that the formed microstructure of solid material 34 contains spherical, agglomerated and dendritic mixed carbides in the continuous matrix. It does not contain dendritic formations of $(Fe,W)_{12}C$ and $(Fe,W)_6C$. The matrix is continuous and contains Fe, Co and unreacted W. Areas 1, 2, 3 and 5 show carbide agglomerates, area 4 shows dendritic carbides, and area 6 shows spherical carbides. Brighter (white) carbides in FIG. 2 correlate with higher amount of hexagonal type WC. Darker (grey) carbides in FIG. 2 correlate with higher content of FCC type TiC and (Ti,W)C. The presence of FCC structure TaC can be observed in some of the carbide formations.

As shown at higher magnification in FIG. 3, the majority of the spherical carbides have FCC structure (Ti,W)C carbides in the centre, surrounded by hexagonal WC. The grain size of the spherical carbides of TiC, and where Ta, V, Nb, Cr and Zr are used the carbides of TaC, VC, NbC, CrC, ZrC, is 1 to 5 μm.

An alternative material has a composition of 0.5 to 20 weight % metal matrix, 60 to 85 weight % WC, 10 to 25 weight % TiC and optionally 0.5 to 8% additives. Pure Tungsten Carbide powder is deposited onto a steel strip with Titanium powder and after solidification of the melt pool, the material composition of the strip edge is 60 to 85 weight % WC, 10 to 25 weight % TiC and 0.5 to 20 weight % of Fe metal matrix obtained from the constituents of the steel strip when molten in melt pool 32. The Titanium again eliminates formation of (W,Fe)C. If desired additives of one or more of Ta, V, Nb, Cr, Zr and Hf can be added with the Tungsten Carbide powder and Titanium powder.

The invention claimed is:

1. A carbide material formed from a melt pool on a ferrous substrate comprising Fe and C, the carbide material comprising:
    tungsten carbide of 60 to 85 weight %,
    titanium carbides of 10 to 25 weight %,
    a metal matrix of 0.5 to 20 weight % comprising Fe, and
    spherical carbides, comprising the tungsten carbide and the titanium carbides,
    wherein the spherical carbides have a grain size of 1 to 5 μm in diameter, and the carbide material comprises no more than 0.01 weight % of iron tungsten carbides having a form of $(W, Fe)_6C$ and $(W,Fe)_{12}C$ including iron tungsten carbides formed with the Fe and C of the ferrous substrate.

2. The carbide material according to claim 1, wherein the metal matrix is in a range of 4.5 to 20 weight %.

3. The carbide material according to claim 1, wherein the metal matrix further comprises at least one or both of Co and Ni.

4. The carbide material according to claim 1, wherein the metal matrix comprises Co and Fe.

5. The carbide material according to claim 1, further comprising additional compounds in a range of 0.5 to 8 weight % in sum or individually, the additional compounds being one or more of TaC, VC, NbC, HfC, ZrC, $Cr_3C_2$ and $Cr_7C_3$.

6. A device comprising a ferrous substrate and a carbide material according to claim 1 formed on at least part of the ferrous substrate.

7. The carbide material of claim 1, wherein the tungsten carbide and the titanium carbides are generated by reaction of elemental powder of carbon with elemental powders of tungsten and titanium.

\* \* \* \* \*